United States Patent
Leyko et al.

(10) Patent No.: US 9,683,516 B2
(45) Date of Patent: Jun. 20, 2017

(54) CONVERGENT-DIVERGENT NOZZLE FOR A TURBINE ENGINE

(71) Applicant: SNECMA, Paris (FR)

(72) Inventors: Matthieu Leyko, Melun (FR); Jean Bertucchi, Thiais (FR); Mathieu Gaillot, Paris (FR)

(73) Assignee: SNECMA, Paris (FR)

( * ) Notice: Subject to any disclaimer, the term of this patent is extended or adjusted under 35 U.S.C. 154(b) by 179 days.

(21) Appl. No.: 14/363,508

(22) PCT Filed: Dec. 4, 2012

(86) PCT No.: PCT/FR2012/052795
§ 371 (c)(1),
(2) Date: Jun. 6, 2014

(87) PCT Pub. No.: WO2013/083908
PCT Pub. Date: Jun. 13, 2013

(65) Prior Publication Data
US 2015/0033747 A1   Feb. 5, 2015

(30) Foreign Application Priority Data

Dec. 7, 2011 (FR) ..................... 11 61282

(51) Int. Cl.
*F02K 1/00* (2006.01)
*F02K 1/82* (2006.01)
*F02K 3/06* (2006.01)

(52) U.S. Cl.
CPC ............... *F02K 1/00* (2013.01); *F02K 1/82* (2013.01); *F02K 3/06* (2013.01); *F05D 2250/71* (2013.01)

(58) Field of Classification Search
CPC ...... F02K 1/00; F02K 9/97; F02K 1/40; F02K 1/52; F02K 1/44; F02K 1/46
See application file for complete search history.

(56) References Cited

U.S. PATENT DOCUMENTS 3,080,711 A * 3/1963 Connors ................. F02K 1/085
239/127.1
3,261,164 A * 7/1966 Tumicki .................. F02K 1/06
239/265.37
(Continued)

FOREIGN PATENT DOCUMENTS

| EP | 1 884 650 A1 | 2/2008 |
| FR | 2.217.559 | 9/1974 |
| FR | 2 907 853 A1 | 5/2008 |

OTHER PUBLICATIONS

International Search Report issued Apr. 18, 2013, in PCT/FR2012/052795, filed Dec. 4, 2012.

*Primary Examiner* — Gerald L Sung
(74) *Attorney, Agent, or Firm* — Oblon, McClelland, Maier & Neustadt, L.L.P.

(57) ABSTRACT

A turbine engine convergent-divergent nozzle including an annular central element and an annular cap arranged coaxially around the central element to co-operate with the central element to define an annular flow channel for a gas stream from the engine. Between a throat section and an ejection section of the nozzle, the central element and the cap present respective internal profiles in longitudinal section that are modeled by curves having respective radii of curvature that are identical in absolute value.

5 Claims, 2 Drawing Sheets

(56) References Cited

U.S. PATENT DOCUMENTS

| | | | | |
|---|---|---|---|---|
| 3,289,946 | A | * | 12/1966 | Lennard .................... F02K 1/08 239/265.39 |
| 3,896,615 | A | * | 7/1975 | Slatkin ...................... F02K 1/00 239/265.11 |
| 3,974,648 | A | * | 8/1976 | Kepler ...................... F02K 7/10 137/15.2 |
| 4,069,661 | A | * | 1/1978 | Rundell .................. F02K 3/075 60/204 |
| 4,765,135 | A | * | 8/1988 | Lardellier ................. F01D 5/03 416/127 |
| 4,802,629 | A | * | 2/1989 | Klees ...................... F02K 1/085 239/265.19 |
| 5,897,120 | A | * | 4/1999 | Scavo .................... F16J 15/122 239/265.35 |
| 2005/0047942 | A1 | * | 3/2005 | Grffin ..................... F02K 3/072 417/423.1 |
| 2006/0016171 | A1 | * | 1/2006 | Renggli .................... F02K 1/09 60/204 |
| 2008/0022690 | A1 | | 1/2008 | Chanez et al. |
| 2010/0107597 | A1 | * | 5/2010 | Crosta .................... F02K 1/827 60/226.1 |
| 2010/0212288 | A1 | * | 8/2010 | Suchezky ............... B64C 15/12 60/228 |
| 2010/0232930 | A1 | * | 9/2010 | Gregory ................... F02C 3/14 415/115 |
| 2015/0113946 | A1 | * | 4/2015 | Willie ...................... F02K 1/06 60/228 |

\* cited by examiner

CONVERGENT-DIVERGENT NOZZLE FOR A TURBINE ENGINE

BACKGROUND OF THE INVENTION

The present invention relates to the general field of turbine engine nozzles. It relates more precisely to the geometrical profile of nozzles of the convergent-divergent type.

Applications of the invention lie with bypass turbojets and turboprops for aircraft.

In known manner, a nozzle of a bypass turbojet comprises a central body, a primary cap arranged coaxially around the central body so as to co-operate therewith to define a primary flow channel for a hot stream, and a secondary cap arranged coaxially around the primary cap so as to co-operate therewith to define a secondary flow channel for a cool stream. When such a nozzle is of the convergent-divergent type, it presents a cross-section of the primary channel and/of the secondary channel that decreases going downstream prior to enlarging at its downstream end.

Likewise, a nozzle of a turboprop comprises a central body and an annular cap arranged coaxially around the central body so as to co-operate therewith to define an annular flow channel for a hot stream from the turboprop. When such a nozzle is of the convergent-divergent type, its channel presents a cross-section that decreases going downstream prior to enlarging at its downstream end.

Convergent-divergent nozzles of this type serve to improve the operability of the compressors feeding the nozzles (e.g. the fan in a nozzle of a bypass turbojet). Specifically, for a given throat section, a convergent-divergent nozzle makes it possible to obtain a flow rate on takeoff that is greater than is possible with a purely convergent nozzle.

Nevertheless, designing a nozzle of convergent-divergent type is an operation that is difficult and complicated; a poor design for the geometrical shape of a nozzle can greatly degrade its aerodynamic performance without achieving any improvement in the operability of the engine (i.e. in the controlability of the flow rate through the nozzle between two operating points of the turbine engine).

OBJECT AND SUMMARY OF THE INVENTION

A main object of the present invention is thus to mitigate such drawbacks by proposing a special shape for a nozzle of convergent-divergent type that makes it possible to increase the aerodynamic performance of the nozzle while conserving operability of the engine.

This object is achieved by a turbine engine convergent-divergent nozzle comprising an annular central element and an annular cap arranged coaxially around the central element so as to co-operate therewith to define an annular flow channel for a gas stream from the engine, wherein, in accordance with the invention, between a throat section and an ejection section of the nozzle, the central element and the cap present respective internal profiles in longitudinal section that are modeled by curves having respective radii of curvature that are identical in absolute value.

Compared with a prior art convergent-divergent nozzle, the Applicant has observed that having identical radii of curvature (in absolute value) between the curves modeling the respective internal profiles of the central element (which may for example be the primary cap of a bypass turbojet) and the cap of the nozzle (which may for example be the secondary cap of a bypass turbojet) has the consequence of significantly improving the aerodynamic performance of the nozzle and the operability of the engine.

Preferably, the respective internal profiles in longitudinal section of the central element and of the cap are symmetrical about an axis of symmetry.

Under such circumstances, the axis of symmetry may be inclined relative to a longitudinal axis of the engine and may form an angle therewith lying in the range 5° to 20°.

The invention also provides a bypass turbojet including a convergent-divergent nozzle as defined above.

The invention also provides a turboprop including a convergent-divergent nozzle as defined above.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
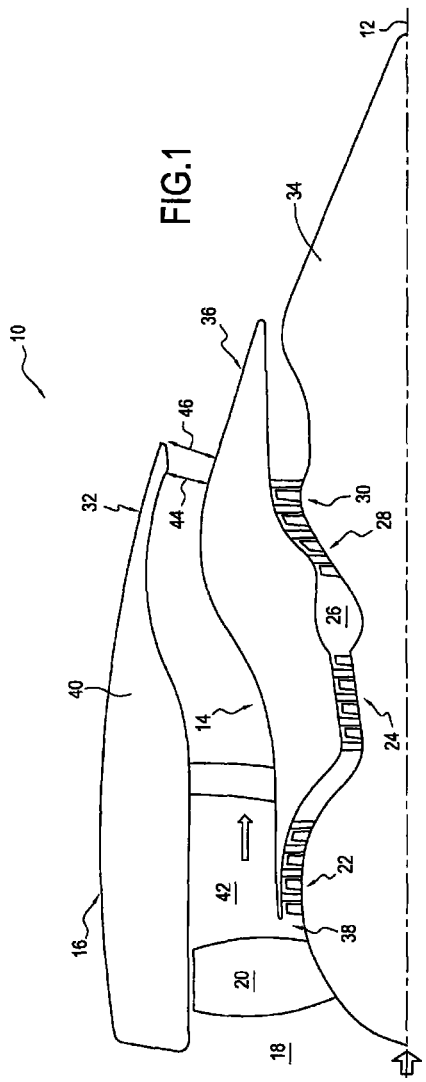
FIG. 1 is a diagrammatic half-view in longitudinal section of a bypass turbojet fitted with a nozzle of the invention.

The invention applies to any convergent-divergent type nozzle fitted to a turbine engine, and in particular a bypass turbojet 10 such as that shown in FIG. 1.

In FIG. 1, the bypass turbojet 10 possesses a longitudinal axis 12 and comprises a gas turbine core 14 and an annular nacelle 16 centered on the axis 12 and arranged concentrically around the core.

From upstream to downstream in the flow direction of a stream of air passing through the engine, the core 14 has an air inlet 18, a fan 20, a low pressure compressor 22, a high pressure compressor 24, a combustion chamber 26, a high pressure turbine 28, and a low pressure turbine 30, each of these elements being arranged along the longitudinal axis 12.

The nozzle 32 for ejecting the gas produced by such an engine is made up of an annular central body 34 centered on the longitudinal axis 12 of the engine, an annular primary cap 36 surrounding the central body coaxially and co-operating therewith to define a primary annular channel 38, and an annular secondary cap 40 surrounding the primary cap coaxially and co-operating therewith to define a secondary annular channel 42 coaxial with the primary channel (in the embodiment of FIG. 1, both the nacelle 16 of the turbojet and the secondary cap 40 of the nozzle are constituted by the same part).

The nozzle 32 is of the convergent-divergent type, i.e. it presents a cross-section of the primary channel 38 and/or of the secondary channel 42 that decreases going downstream, prior to enlarging at its downstream end. In the example shown in FIGS. 1 and 2, this applies to the secondary channel 42 that presents a cross-section that decreases going downstream before enlarging at its downstream end.

Furthermore, in the description below, the throat section 44 is defined as being the smallest cross-section of the secondary channel 42 along the length of the nozzle. Likewise, the ejection section 46 is defined as being the cross-section of the secondary channel that is at the downstream end of the nozzle.

In the invention, between the throat section 44 and the ejection section 46 of the nozzle, the respective internal profiles in longitudinal section of the primary cap 36 and of the secondary cap 40 present internal profiles that are modeled by curves $C_{36}$ and $C_{40}$ with respective radii of curvature $\gamma_{36}$ and $\gamma_{40}$ that are identical in absolute value.

Figure 2A:
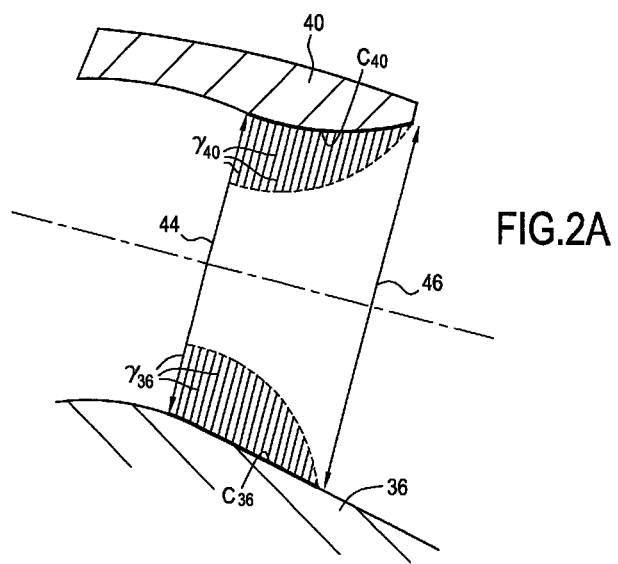
FIG. 2A is an enlargement of FIG. 1 showing the respective internal profiles of the elements making up the FIG. 1 nozzle.

FIG. 2A shows more precisely the nozzle in section view in a longitudinal plane (i.e. a plane containing the longitudinal axis of the turbojet).

In FIG. 2A, the primary cap 36 presents an internal profile that can be modeled between the throat section 44 and the ejection section 46 of the nozzle by a curve $C_{36}$ that may be in the form of an equation of the type y(x) in a rectangular coordinate system. The same applies to the curve $C_{40}$ modeling the internal profile of the secondary cap 40.

The respective radii of curvature $\gamma_{36}$ and $\gamma_{40}$ of the curves representing the internal profiles in longitudinal section of the primary cap and of the secondary cap in their portions lying between the throat section and the ejection section are obtained appropriately from the second derivative of the ordinate y of these curves $C_{36}$, $C_{40}$ relative to the axial position x along the curve, i.e.:

$$\gamma \approx \frac{d^2 y}{dx^2}$$

In the invention, these radii of curvature $\gamma_{36}$ and $\gamma_{40}$ are identical in absolute value (one being positive and the other negative).

Figure 2B:
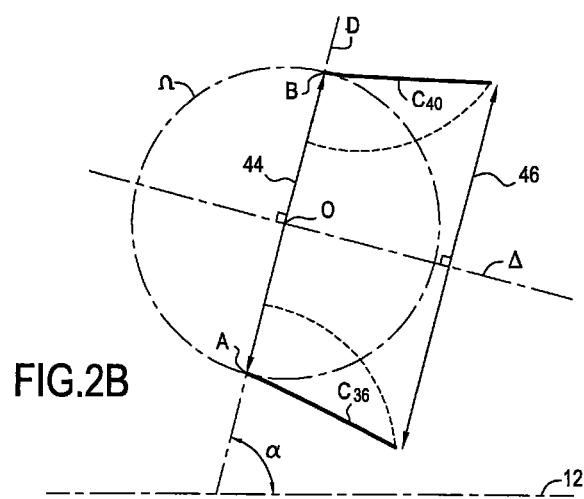
FIG. 2B shows an embodiment of the respective internal profiles of the FIG. 2A nozzle.

FIG. 2B shows an embodiment of respective internal profiles for the primary and secondary caps of the FIG. 2A nozzle satisfying the condition for identical respective curvatures $\gamma_{36}$ and $\gamma_{40}$.

Initially, in a longitudinal plane, a straight line D is drawn at an angle α relative to the longitudinal axis 12 of the turbojet, this angle α being a design parameter. By way of example, the angle α lies in the range 75° to 80°.

The intersection between the line D and the internal covering of the primary cap 36 defines a point A. A circle Ω of center O placed on the line D is then drawn so as to be tangential to the internal covering of the primary cap 36 (i.e. passing through the point A). The diameter of this circle and also the angle α are selected as a function of the divergence ratio required to make the engine operable (the term "divergence ratio" is used to mean the ratio between the throat section and the ejection section of the nozzle). The point that is symmetrical to A about the point O is the point B situated on the circle Ω.

An axis of symmetry Δ is then drawn, this axis being perpendicular to the line D and passing through the point O. The profile that is symmetrical to the internal profile $C_{36}$ of the primary cap 36 relative to this axis of symmetry is then drawn to form the internal profile $C_{40}$ of the secondary cap. The respective internal profiles of the primary cap and of the secondary cap thus preferably present symmetry (in longitudinal section).

Furthermore, with an angle α lying in the range 75° to 80°, the axis of symmetry Δ forms an angle lying in the range 5° to 20° relative to the longitudinal axis 12 of the engine.

Once the internal profiles of the primary and secondary caps have been drawn in this way in the longitudinal profile shown in FIG. 2B, these profiles are rotated through 360° about the longitudinal axis 12 of the engine to define surfaces of revolution.

In the above-described example, the nozzle is of the convergent-divergent type in the secondary channel. Naturally, it could alternatively be of the convergent-divergent type in the primary channel, in which case the condition for identical curvatures would apply to the profiles of the central body and of the primary cap situated facing it.

The invention claimed is:

1. A turbine engine convergent-divergent propulsion nozzle comprising: an annular central element and an annular cap arranged coaxially around the annular central element so as to co-operate with the annular central element to define an annular flow channel for an engine gas stream, wherein between a throat section of the turbine engine convergent-divergent propulsion nozzle, which is the smallest cross-section of the annular flow channel, and an ejection section of the nozzle, which is a cross-section at a downstream end of the turbine engine convergent-divergent propulsion nozzle, an external profile of the annular central element and an internal profile of the annular cap in longitudinal section are modeled by curves, second derivatives of the curves relative to an axial position along the respective curve have respective radii that are identical in absolute value, and wherein the turbine engine convergent-divergent propulsion nozzle is a fixed nozzle in the annular flow channel.

2. The turbine engine convergent-divergent propulsion nozzle according to claim 1, wherein the internal profile and the external profile in longitudinal section of the annular central element and of the annular cap are symmetrical about an axis of symmetry.

3. The turbine engine convergent-divergent propulsion nozzle according to claim 2, wherein the axis of symmetry is inclined relative to a longitudinal axis of the engine and forms an angle with the longitudinal axis in a range of 5° to 20°.

4. A bypass turbojet comprising a turbine engine convergent-divergent propulsion nozzle according to claim 1.

5. A turboprop comprising a turbine engine convergent-divergent propulsion nozzle according to claim 1.

* * * * *